(No Model.) 2 Sheets—Sheet 1.
S. S. WHEELER & C. G. CURTIS.
DYNAMO ELECTRIC MACHINE AND ELECTRIC MOTOR.
No. 354,588. Patented Dec. 21, 1886.
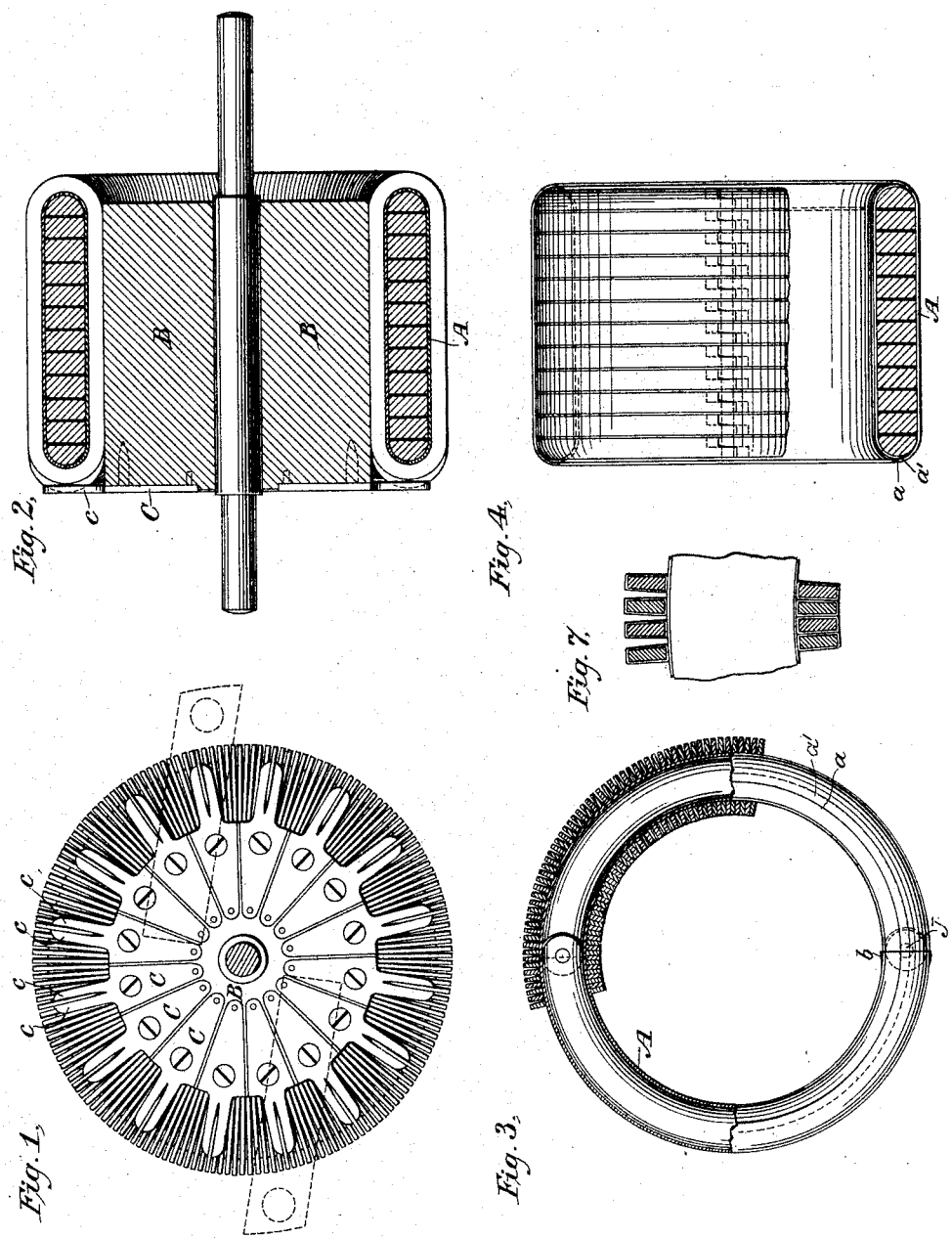
Witnesses
Geo. W. Breck
Chas. J. Maguire
Inventors
S. S. Wheeler & C. G. Curtis
By their Attorneys
Curtis & Crocker (No Model.) 2 Sheets—Sheet 2.

S. S. WHEELER & C. G. CURTIS.
DYNAMO ELECTRIC MACHINE AND ELECTRIC MOTOR.

No. 354,588. Patented Dec. 21, 1886.

UNITED STATES PATENT OFFICE.

SCHUYLER S. WHEELER AND CHARLES G. CURTIS, OF NEW YORK, N. Y., ASSIGNORS TO THE C. & C. ELECTRIC MOTOR COMPANY.

DYNAMO-ELECTRIC MACHINE AND ELECTRIC MOTOR.

SPECIFICATION forming part of Letters Patent No. 354,588, dated December 21, 1886.

Application filed July 14, 1886. Serial No. 207,976. (No model.)

*To all whom it may concern:*

Be it known that we, SCHUYLER S. WHEELER and CHARLES G. CURTIS, of the city, county, and State of New York, have invented certain new and useful Improvements in Dynamo-Electric Machines and Electric Motors, of which the following is a specification.

In an application filed by said Curtis and Francis B. Crocker, March 4, 1886, Serial No. 194,020, there are described certain improvements in armatures for dynamo-electric machines and electric motors.

Our present invention consists in certain improvements upon the form of armature therein described, though some of these improvements are applicable to any form of machine, by which we are enabled to increase the effectiveness or power of the machine, and at the same time to simplify and greatly reduce the cost of construction.

Figure 5:
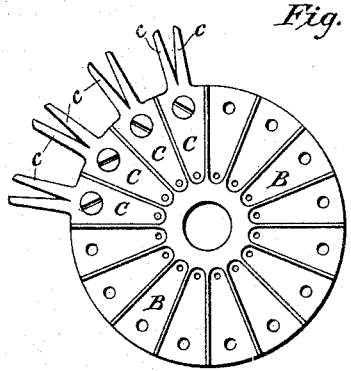
Figure 6:
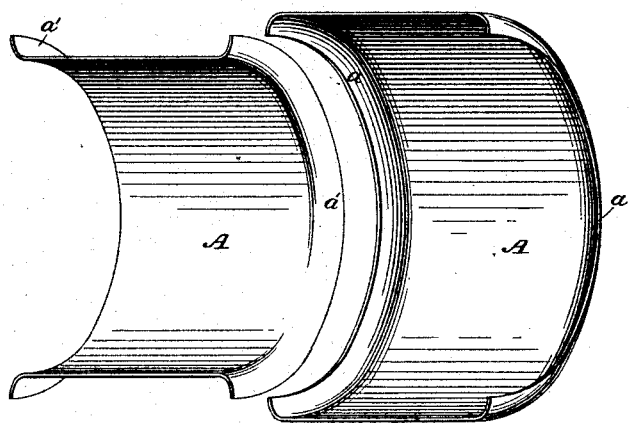

Our invention is represented in the accompanying drawings, Figure 1 being an end view of the armature, showing our improved form of commutator and manner of connecting it to the winding. Fig. 2 is a sectional view of the armature through its axis. Fig. 3 is an end view of our improved armature-core, showing our improved insulating core-covering and some of the winding, partly in section. Fig. 4 is a side view of our improved iron core, partly in section, and showing part of the core-covering broken away. Fig. 5 is an end view of the drum or block on which the armature is mounted, showing the end of this block stamped or formed to receive the commutator-strips. Fig. 6 is a view of our improved insulating core-covering, showing the covering made in two parts; and Fig. 7 is a sectional view of a portion of the armature, showing our improved winding formed of a trapezoidal wire or conductor, as hereinafter described.

Our improved armature-core is built up of a series of iron rings strung along to form an annulus or tube and jointed in two parts, so as to be capable of being opened and have the winding slipped over it, as may be seen from Figs. 3 and 4. It is like the core described in the application before referred to, except that instead of having the half-rings of which it is built up strung along alternately on opposite sides of the armature, thus leaving spaces between the consecutive half-rings equal to the thickness of a ring, we mortise out or cut away part of the end of each half-ring, so that the two halves of each ring mortise or fit into each other at the joint, so that the consecutive rings of each half of the armature can be got close together, and the amount of iron in the armature thereby practically doubled or greatly increased, which of course increases the strength of the magnetic field. The consecutive rings may be prevented from touching each other, in order to prevent Foucault currents, either by introducing layers of insulating material or by regulating the thickness of the mortise or cut-away part of the ring, so that the rings rest in contact at the hinge or jointed part, but stand apart slightly elsewhere, as shown in Fig. 4. In order to protect this core and prevent the winding from accidentally coming in contact with it at any point, we have devised the core-covering represented in Fig. 6. It consists of a sheath or shell of some suitable insulating material—such as paper, papier-maché, rubber, &c.—molded or otherwise formed into the shape of the armature-core, so that it can readily be slipped over or applied to the core, thus forming a complete covering to prevent the winding from coming in contact with the core at any point. This shell we preferably make in the form of two half-annuli, A A, each of which is made in two pieces—an inside and outside part—as shown in Fig. 6, and the edges of which, *a* and *a'*, overlap when they are in place upon the core, as seen in Figs. 3 and 4. The ends of the shells also overlap, as shown at B, so that no part of the core is at all exposed to the winding.

With this form of covering or insulation all that is necessary in constructing an armature is to string a sufficient number of half-rings upon the pin J, on which they are jointed, and then apply a prepared sheath or shell to the inside and outside of the ring and glue the edges of the shell where they overlap together, if desirable. Then, when the core is open, the winding, which has been previously prepared, and may be formed by the process described in an application filed by us on the 2d day of July, 1886, Serial No. 206,907, may readily be slipped onto the core over the insulating-shell, and the two parts of the ring then brought together and connected by another pin, or in any other suitable way, according to the process of constructing armatures referred to in the last-mentioned application.

Our sheath or shell, which forms a complete covering for the iron core, may be made in differently-divided parts from those shown in Fig. 6; or the two parts which form the complete half-annulus may be formed in one entire piece, which can be slipped over each half of the core when the ring is open.

To enable the commutator to be readily and reliably connected with the winding, we have devised a new form of commutator-strip and method of connecting and soldering each strip to the winding. This form of commutator is shown in Figs. 1, 2, and 5. In Figs. 1, 2, and 3 we have shown the winding formed of a flat wire, ribbon, or conductor wound on edge in a single layer, like that described in the application before referred to, filed March 4, 1886, Serial No. 194,020; but of course our improved form of commutator and method of connecting the same are also applicable to all other forms of windings. Figs. 1 and 2 also show a form of winding in which certain of the convolutions, at the points where connection is made to the commutator, are raised or project beyond the other convolutions, so as to enable them to be easily connected to the commutator-strips, as fully described in the application filed by us on the 2d day of July, 1886, Serial No. 206,907.

We prefer to attach the commutator to the end or face of the block or drum B, on which the armature is mounted, though our invention is applicable to other forms of commutators or other ways of mounting them.

We form each commutator-strip C with a forked or split extension or portion, c c, which straddles or grasps the projecting convolution or some part of the winding. It is then a very easy operation to solder each commutator-strip to the projecting convolution, and the connections so made are very good and reliable. These commutator-strips may be formed with a slot or space in their forked ends just wide enough to receive the wire or convolution; or they may be formed with the split portion or extension open, as shown in Fig. 5, and when the commutator-strip is in place the ends or prongs may be pinched or drawn together, so as to grip the wire, after which the soldering is done. Instead of having the extension of each part of the commutator-strip split or forked, as we have shown, one of the prongs or claws may be dispensed with, in which case the extension part would simply rest in contact with and be soldered to the winding on one side only.

In order to hold the commutator-strips more securely in place and enable them to be more quickly set in exactly their right positions, we stamp or mold or otherwise form the end of the block B, or the face, whatever it may be, which forms the mounting for the commutator, with the proper number of impressions or recesses, into which exactly fit the commutator-strips, leaving narrow fins or strips between the consecutive commutator-strips, which prevent them from coming in contact and hold them exactly the right distance apart, as also shown in Fig. 5, in which four of the commutator-strips are shown in place. The block or commutator mounting may be so prepared by first stamping it with an impression-die, and then attaching the commutator-strips in place; or the commutator-strips may be mounted in a holding-die in their proper relative positions and then pressed a slight amount into the face of the block.

In Fig. 7 we have shown a new form of winding, in which, instead of having a flat wire or ribbon with parallel sides wound on edge, we use a wire or ribbon the cross-section of which is trapezoidal or sector-shaped, and which is wound so that its thicker or wider edge comes next to the core, the narrow or thin edge projecting outwardly on the outside of the ring and inwardly on the inside of the ring, as clearly shown. By forming the wire so that its opposite sides are at the proper angle to each other, depending of course upon the thickness of the wire compared with the diameter of the ring, the adjacent flat sides of the wires on the inside of the ring will stand exactly parallel to each other, and the flat sides of the wire (which is of course provided with some insulated covering) will bear against each other over their entire area, instead of only bearing against each other at their edges nearest the center of the ring, as is the case where parallel-sided wire is used. By these means the danger of the insulation being cut through and allowing the adjacent wires to come in contact is very much reduced, the winding forms a compact and more rigid mass on the inside of the ring, and the cross-section or the conductivity of the winding is increased.

We are aware that in English Patent No. 1,736 of 1883 there is described a jointed armature-core built up of semicircular flat half-rings placed side by side in alternate positions, so as to form two sets of half-rings in such a way that one set projects beyond the other at the other end, and when the two halves of the core are brought together the alternate rings fit into one another, the spaces between the alternate rings being occupied by the intervening rings, thus enabling the entire core-space to be filled with iron; but we do not claim this construction.

What we claim as our invention, and desire to secure by Letters Patent, is—

1. The herein-described armature-core, composed of a series of iron rings and jointed so that the core can be opened, the ends of each ring where they come together at the joints being partly cut away, so as to fit into one another, and thereby enable a greater number of rings, and consequently more iron, to be put into the core, substantially as described.

2. The combination, with an armature-winding formed with certain raised or projecting convolutions to which the commutator-strips are connected, of commutator-strips formed with extensions which rest in contact with and are soldered to the sides of the projecting convolutions.

3. The herein-described commutator-strip, formed with the diverging projections c c, adapted to be drawn together so that the armature connection or winding can be inserted between the projections and the projections then forced or drawn together so as to grasp the armature-winding, substantially as described.

4. The herein-described commutator-strip, formed with sector-shaped portion C and the diverging fingers or projections c c, substantially as described.

5. The herein-described process of connecting the commutator of an armature, consisting in forming the commutator so that each commutator-strip is provided with a forked extension or portion formed with an opening to receive the armature connection or winding, these openings being larger than the wire or winding which enters them, applying the commutators so formed to the wound armature, and then forcing or drawing together the forced extensions or openings so as to grasp the wire or winding, substantially as described.

6. The combination, with an armature-winding formed with certain raised or projecting convolutions to which the commutator-strips are connected, of commutator-strips formed with split or forked extensions which straddle or rest against the raised convolutions on each side thereof and are soldered thereto, substantially as described.

7. The herein-described core-covering, consisting of a shell or sheath of paper or other suitable insulating material molded or otherwise formed into the shape of the core, and adapted to be slipped or fitted over the core and prevent the winding from coming in contact therewith, substantially as described.

8. The herein-described core-covering, consisting of an insulating shell or sheath made in the form of annular or partly-annular shaped pieces and adapted to be fitted over the core, substantially as described.

9. The combination, in a Gramme ring armature, with the iron ring or core, of a winding formed of a wire or conductor having a trapezoidal or sector-shaped cross-section, and wound upon the core so that its thicker edge or side is nearest the core, whereby the conductivity of the winding is increased and the flat side of each wire is parallel with the side of the adjacent wire on the inside of the ring, substantially as described.

SCHUYLER S. WHEELER.
CHARLES G. CURTIS.

Witnesses:
GEO. BRUSH,
CHAS. J. MAGUIRE.